US006963146B2

(12) United States Patent
Zecca et al.

(10) Patent No.: US 6,963,146 B2
(45) Date of Patent: Nov. 8, 2005

(54) MODULAR POWER CONTROL APPARATUS

(75) Inventors: James W. Zecca, Telford, PA (US); George L. Lewis, Raleigh, NC (US)

(73) Assignee: Teleflex Incorporated, Limerick, PA (US)

(*) Notice: Subject to any disclaimer, the term of this patent is extended or adjusted under 35 U.S.C. 154(b) by 495 days.

(21) Appl. No.: 10/072,755

(22) Filed: Feb. 7, 2002

(65) Prior Publication Data
US 2002/0105228 A1 Aug. 8, 2002

Related U.S. Application Data

(60) Provisional application No. 60/267,167, filed on Feb. 7, 2001.

(51) Int. Cl.[7] .............................................. B60L 1/00
(52) U.S. Cl. ...................................... 307/9.1; 307/10.1
(58) Field of Search ............................... 307/9.1, 10.1, 307/38–41, 43

(56) References Cited

U.S. PATENT DOCUMENTS

| 3,949,238 | A |   | 4/1976  | Brookes |
| 3,952,209 | A | * | 4/1976  | Shaklee et al. ............... 307/9.1 |
| 4,507,720 | A | * | 3/1985  | Colbrese ...................... 363/13 |
| 4,652,769 | A | * | 3/1987  | Smith et al. ................... 307/31 |
| 4,877,972 | A | * | 10/1989 | Sobhani et al. ............... 307/43 |
| 5,179,376 | A | * | 1/1993  | Pomatto ................ 340/870.02 |
| 5,434,562 | A | * | 7/1995  | Reardon ..................... 713/200 |
| 5,457,629 | A |   | 10/1995 | Miller et al. |
| 5,514,859 | A |   | 5/1996  | Seigel |
| 5,644,304 | A | * | 7/1997  | Pavarotti et al. ............ 340/953 |
| 5,656,869 | A | * | 8/1997  | Gluskoter et al. ............ 307/64 |
| 5,675,480 | A | * | 10/1997 | Stanford ...................... 307/58 |
| 5,684,450 | A | * | 11/1997 | Brown .................. 340/310.02 |
| 5,896,418 | A |   | 4/1999  | Hamano et al. |
| 5,999,798 | A | * | 12/1999 | Yang ......................... 455/66.1 |
| 6,038,500 | A |   | 3/2000  | Weiss |
| 6,062,903 | A | * | 5/2000  | Hawes et al. ............... 439/507 |
| 6,107,696 | A |   | 8/2000  | Peter et al. |
| 6,157,555 | A | * | 12/2000 | Hemena et al. ............... 363/71 |
| 6,169,338 | B1 | * | 1/2001  | Stoll et al. .................... 307/11 |
| 6,175,789 | B1 | * | 1/2001  | Beckert et al. ............... 701/33 |
| 6,189,057 | B1 |   | 2/2001  | Schwanz et al. |
| 6,202,008 | B1 |   | 3/2001  | Beckert |
| 6,256,557 | B1 |   | 7/2001  | Avila et al. |
| 6,301,528 | B1 | * | 10/2001 | Bertram et al. ................ 701/1 |
| 6,427,167 | B1 | * | 7/2002  | Siedel ........................ 709/222 |
| 6,459,175 | B1 | * | 10/2002 | Potega ....................... 307/149 |
| 6,469,404 | B1 | * | 10/2002 | Pohjola ..................... 307/10.1 |

(Continued)

Primary Examiner—Robert L. Deberadinis
(74) Attorney, Agent, or Firm—Baker & Hostetler LLP

(57) ABSTRACT

A modular power control apparatus for use with a plurality of peripheral devices. A plurality of modules, which connect to the peripheral devices, are supported by a housing. An interface module is supported by the housing to selectively interface with the plurality of modules for routing data to an appropriate module and peripheral device. A data communication cable is connected to the interface module for transferring data between the interface module and anyone of a variety of devices. A power source is also connected to the housing. The vehicle assembly is characterized by a modular connector supported by the housing and electrically connected to the power source. The modular connector includes a plurality of identical slots with the plurality of modules and the interface module being electrically connected to any one of the identical slots to transfer data between the modules and to provide electrical power to at least one of the modules, thereby facilitating communication with the peripheral devices and providing electrical power to at least one of the peripheral devices within the vehicle assembly.

56 Claims, 3 Drawing Sheets

U.S. PATENT DOCUMENTS 6,472,770 B1 * 10/2002 Pohjola ..................... 307/10.1
6,483,200 B1 * 11/2002 Jacobs ...................... 307/10.1
6,490,515 B1 * 12/2002 Okamura et al. ............. 701/49
6,661,334 B1 * 12/2003 Ives et al. .................. 340/5.64

* cited by examiner

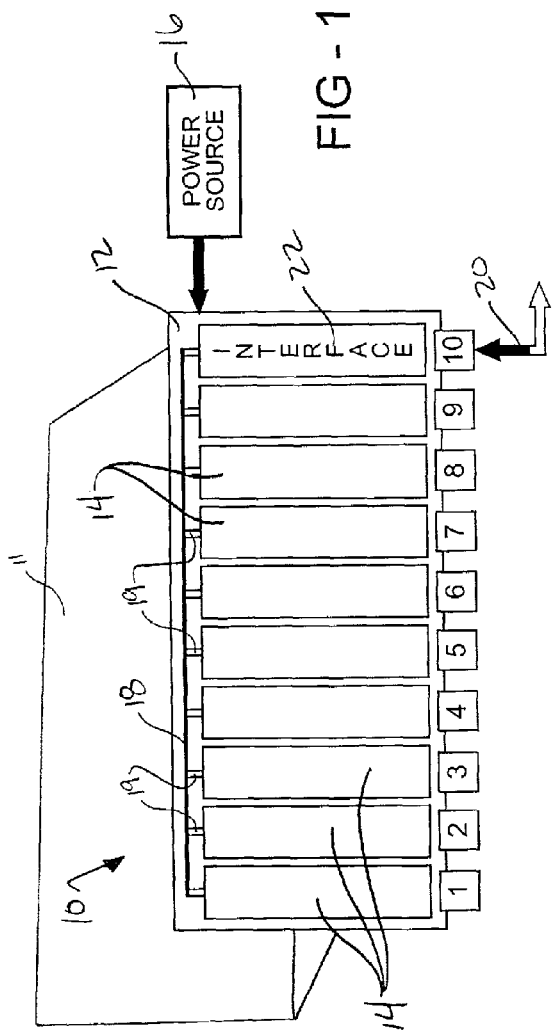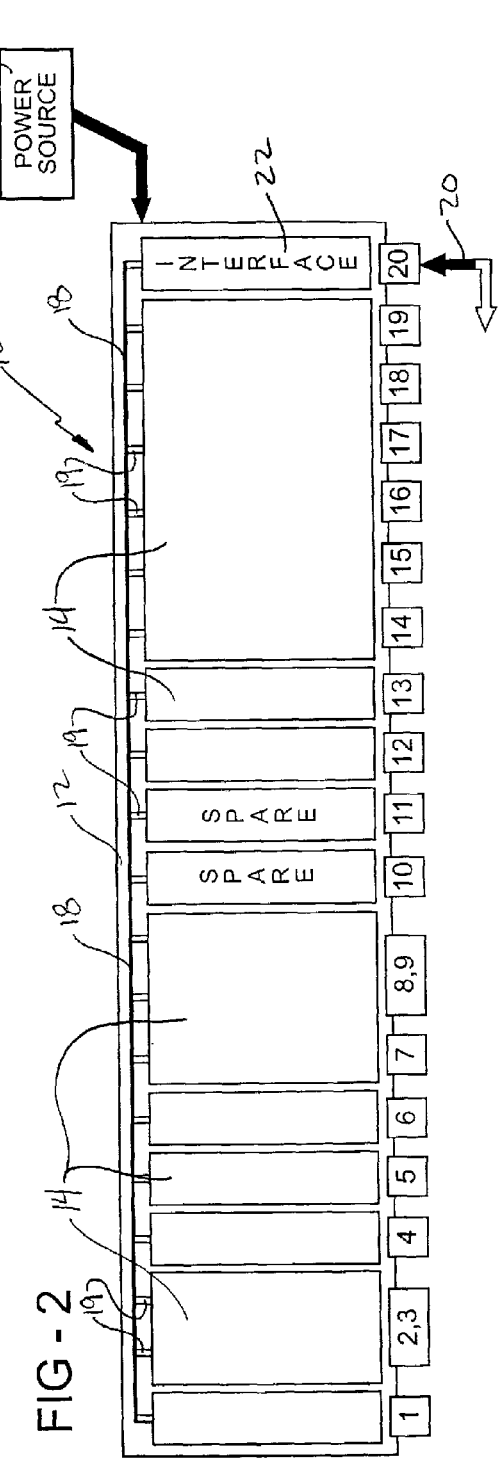

US 6,963,146 B2

MODULAR POWER CONTROL APPARATUS

RELATED APPLICATION

This patent application claims priority to and all the benefits of U.S. Provisional Patent Application Ser. No. 60/267,167, which was filed on Feb. 7, 2001.

BACKGROUND OF THE INVENTION

1. Field of the Invention

The subject invention relates to a modular power control apparatus for use in a vehicle, such as a boat or automobile, to simplify data communications and power connections.

2. Description of the Prior Art

Modern vehicles, such as automobiles and boats, are equipped with numerous electronic devices which require data communication and/or a power connection. Examples of such electronic devices on a boat may include an autopilot, shift/throttle control, lights, fans, a blower, water and fuel tank sensors, switch panels, a bilge pump, gauges, GPS/sonar unit, GPS/radar unit, data display units, speed control sensors, an engine, and pressure sensors. Many boats, such as large boats over 35 feet in length, may have all of these electronic devices and may have redundancy in these devices. For example, there may be two or more helms in the boat such that there would be multiple autopilots, shift/throttle controls, lights, switch panels, gauges, GPS/sonar and GPS/radar units, data display units, and the like. In addition, there may be two or more engines with multiple blowers, water and fuel tank sensors, bilge pumps, and various other sensors.

Typically, each of these electronic devices is wired separately to a power source, such as a fuse box, to a switch panel or data communication port, back to the device itself, and then grounded to complete the electrical circuit. If the electronic device is to be controlled from another switch panel, then the above wiring is repeated. As an example, the wiring for a blower in a 35 foot boat would be approximately 20–30 feet long. In addition, each of the electrical devices required unique connectors.

The individual wiring of these electronic devices becomes complex and costly. In addition, there are serious weight and space concerns when wiring many devices.

Accordingly, it would be advantageous to provide a modular system and apparatus which provides power and data communication to a number of devices while reducing the amount of wiring.

SUMMARY OF THE INVENTION AND ADVANTAGES

A vehicle assembly for use with a modular power control apparatus and a plurality of peripheral devices with the peripheral devices controlling one or more features of the vehicle assembly. The vehicle assembly comprises a support structure adapted to be mounted within the vehicle assembly. A housing is secured to the support structure and a plurality of modules are supported by the housing. A connection port extends from each of the modules for electrically connecting each module to an associated peripheral device. An interface module is supported by the housing and has a communication processor to selectively interface with the plurality of modules for routing data to an appropriate module and peripheral device. A data communication cable is connected to the interface module and disposed outside of the housing for transferring data between the interface module and anyone of a variety of devices within the vehicle assembly. A power source is also connected to the housing.

The vehicle assembly is characterized by a modular connector supported by the housing and electrically connected to the power source. The modular connector includes a plurality of identical slots with the plurality of modules and the interface module being electrically connected to any one of the identical slots to transfer data between the modules and to provide electrical power to at least one of the modules, thereby facilitating communication with the peripheral devices and providing electrical power to at least one of the peripheral devices within the vehicle assembly.

The subject invention is also characterized by at least one of the peripheral devices being directly connected to the data communication cable independent from the connection to the associated module such that the at least one peripheral device communicates directly with the data communication cable outside of the housing independent of the interface module.

Accordingly, the subject invention provides a modular system and apparatus for transferring power and data communication to a number of devices while reducing the amount of wiring. In the example set forth above, the wiring of the 35 foot boat would be reduced to three modular power control apparatuses and 3–4 feet of wiring.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals indicate like or corresponding parts throughout the several views, a modular power control apparatus is generally shown at 10 in FIGS. 1–4. The power control apparatus 10 is preferably used with a vehicle assembly having a support structure 11. Even more preferably, the power control apparatus 10 is designed to be installed within a boat or automobile. As will become apparent, the power control apparatus 10 of the subject invention greatly reduces the amount of wiring and installation necessary to interconnect a plurality of peripheral devices wherein the peripheral devices control one or more features of the vehicle assembly. The particular detail of the peripheral devices is discussed in greater detail below. For illustrative purposes, the foregoing description of the subject invention is discussed in detail with reference to a power control apparatus 10 being mounted in a boat. It should be appreciated that the subject invention is not limited to boat applications and any reference to a boat is merely for descriptive purposes and is in no way limiting.

Figure 1:
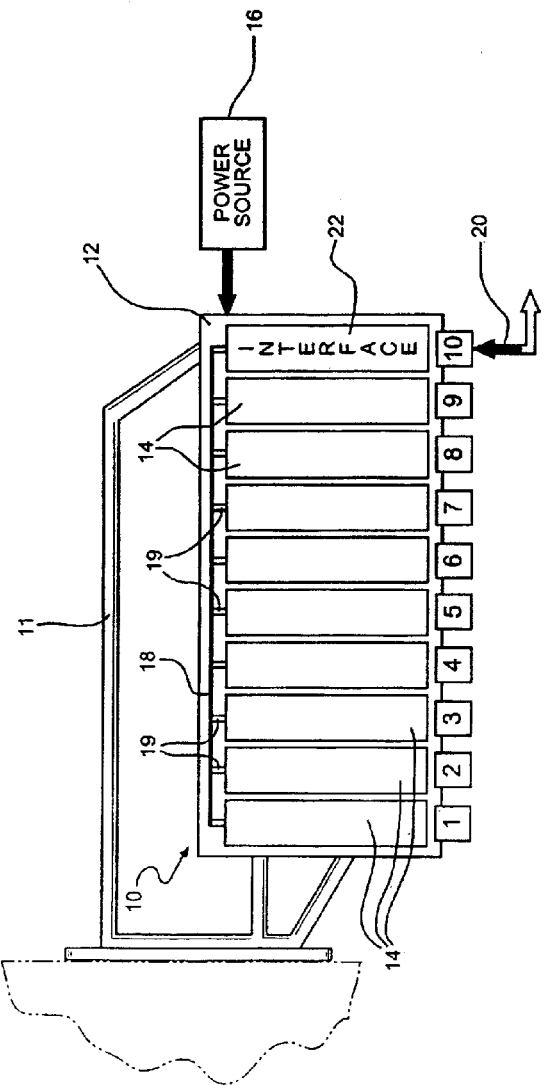
FIG. 1 is a schematic view of a ten slot modular power control apparatus in accordance with the subject invention.
Figure 2:
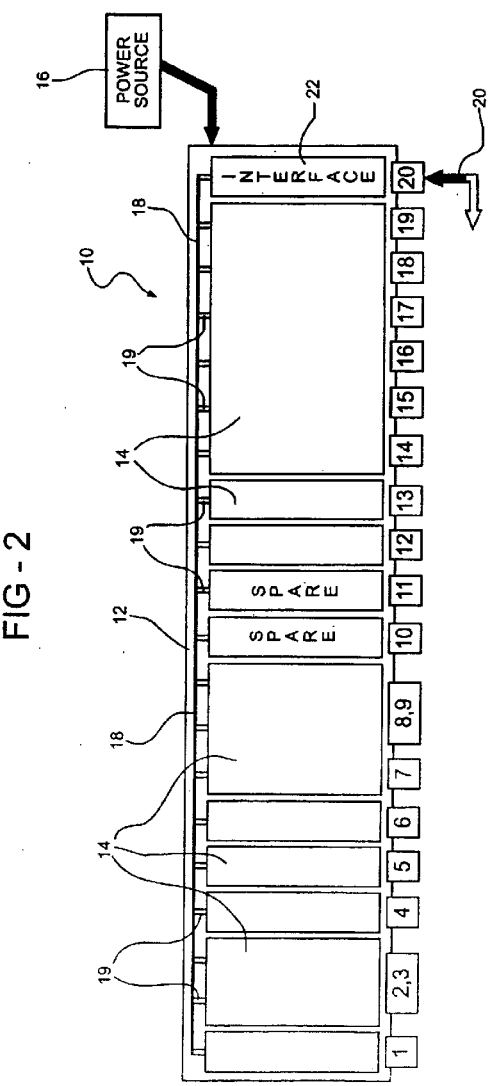
FIG. 2 is a schematic view of a twenty slot modular power control apparatus in accordance with the subject invention.
Figure 4:
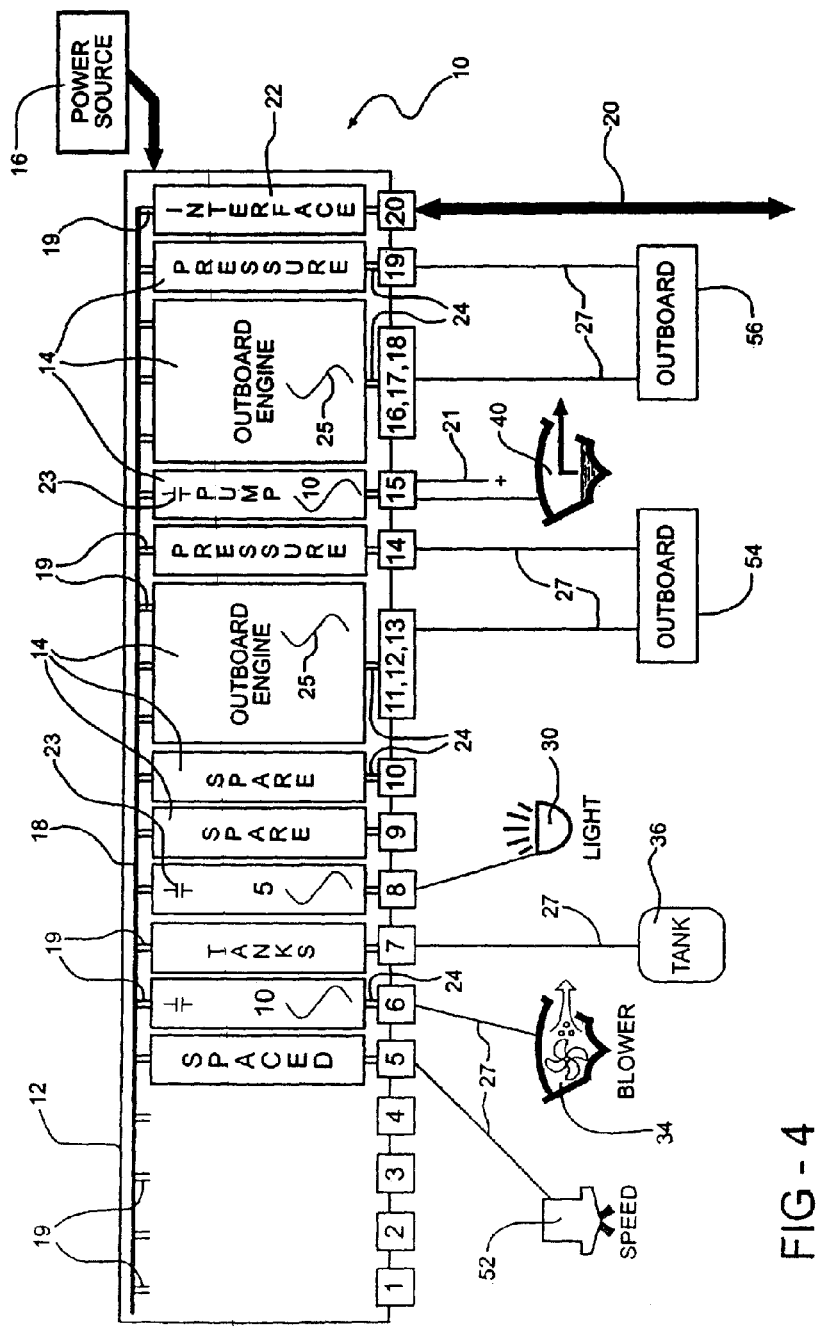

Referring to FIGS. 1 and 2, schematic views of the modular power control apparatus 10 is shown. The power control apparatus 10 includes a housing 12 preferably secured to the support structure 11. A plurality of modules 14 are supported by the housing 12. A power source 16 is connected to the housing 12 to provide electrical power to at least one of the modules 14. The determination of which modules 14 will be electrically connected to the power source 16 is discussed in greater detail below. The power source 16 may be any suitable device to provide enough electrical power as needed.

An interface module 22 is supported by the housing 12 and has a communication processor to selectively interface with the plurality of modules 14 for routing data to an appropriate module 14 and peripheral device. The communication processor therefore receives, interprets, and sends data to, from, and between the modules 14.

A data communication cable 20 is connected to the interface module 22 and is disposed outside the housing 12 for transferring data between the interface module 22 and anyone of a variety of devices within the vehicle assembly. Preferably, the other devices include additional power control apparatuses and/or display devices. In other words, there may be a second power control apparatus having a second housing with a second plurality of modules and a second power source wherein the second housing is connected to the housing 12 through the data communication cable 20. The data communication cable 20 is therefore routed throughout the boat and connected to other interface modules 22 to increase the transfer of data. The data communication cable 20 is preferably a CANBUS type cable which includes a power supply that can be transferred throughout the boat. Even more preferably, the data communication cable 20 provides a maximum of one amp of power for each connected peripheral device with a total of nine amps of power available.

A modular connector 18 is supported by the housing 12 and is electrically connected to the power source 16. The modular connector 18 includes a plurality of identical slots 19. The slots 19 may be of any suitable design or configuration as is known in the art. The plurality of modules 14 and the interface module 22 are electrically connected to any one of the identical slots 19 to transfer data between the modules 14 and to provide electrical power to at least one of the modules 14, thereby facilitating communication with the peripheral devices and providing electrical power to at least one of the peripheral devices within the vehicle assembly. One unique feature of the subject invention is that any module 14, 22 having any type of peripheral device may be connected to any one or more of the slots 19. Preferably, the modular connector 18 may be a suitable type of circuit board or a cable type connector.

As shown in FIG. 1, a power control apparatus 10 having a ten slot modular connector 18 is illustrated such that up to ten modules 14 may be connected to the modular connector 18 with one of the modules being the interface module 22. A power control apparatus 10 having a twenty slot modular connector 18 is illustrated in FIG. 2 such that up to twenty modules 14 may be connected to the modular connector 18 with one of the modules being the interface module 22. As also shown in FIG. 2, some slots, i.e., slots ten and eleven, may remain unoccupied.

In each of the ten slot and twenty slot examples above, the interface module 22 is interconnected between the modular connector 18 and the data communication cable 20. The interface module 22 facilitates the flow of communication between the modules 14 themselves and between the data communication cable 20 and the modules 14. In the preferred embodiment, the modular connector 18 transfers electrical power to the interface module 22 such that the communication processor of the interface module 22 can facilitate the flow of communication.

Figure 3:
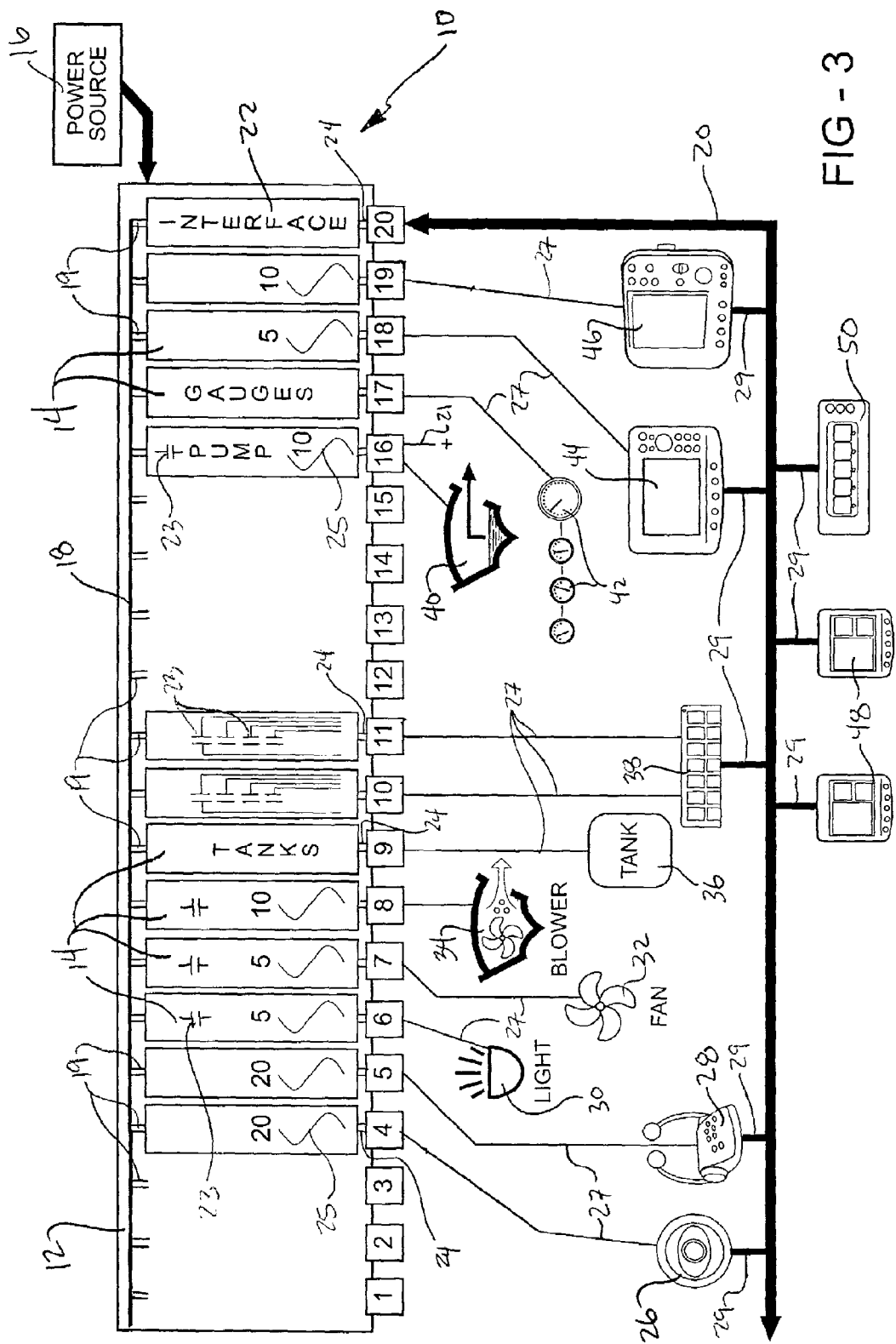
FIG. 3 is a view of the twenty slot modular power control apparatus illustrating the connection of typical peripheral devices which may be found at a helm of a boat.

Referring to FIG. 3, a twenty slot helm power control apparatus 10 is illustrated showing the connection of typical peripheral devices which may be found at a helm of a boat. Each position for the modules 14 in the twenty slot helm power control apparatus 10 is labeled 1–20 for illustrative purposes. It should be appreciated that the example shown is purely for illustrative purposes and is in no way limiting.

Each module 14 includes a connection port 24 extending therefrom for electrically connecting each module 14 to an associated peripheral device. The connection ports 24 may be of any suitable design or configuration based on the design parameters of the peripheral device. If desired, the module 14 can selectively transfer electrical power to the associated peripheral device. Further, the modular connector 18 can transfer data between the modules 14 and the peripheral devices. Preferably, the interface module 22 selectively interfaces and transfers data to an appropriate module 14 and peripheral device.

The helm power control apparatus 10 of FIG. 3 illustrates eleven peripheral devices which are connected to corresponding modules 14. At least one of the plurality of modules 14 includes a power distributor 25 for transferring electrical power from the modular connector 18 to an associated peripheral device. As shown in FIG. 3, modules 14 located at the fourth through eighth, sixteenth, eighteenth, and nineteenth positions have power distributors 25. Preferably, the power distributors 25 draw 5, 7.5, 10, 15, 20, or 30 amps of electrical power from the modular connector 18. As illustrated, modules 14 at the sixth, seventh, and eighteenth positions draw 5 amps of electrical power, modules 14 at the eighth, sixteenth, and nineteenth positions draw 10 amps of electrical power, and modules 14 at the fourth and fifth positions draw 20 amps of electrical power. It should be appreciated that any amount of amperage may be drawn from the modular connector 18 is accordance with any design parameter. In the preferred embodiment, the modular connector 18 transfers electrical power to the interface module 22 and a number of the plurality of modules 14, 22 such that there are at least two modules 14 receiving electrical power.

The power source 16 preferably defines a maximum power level for the modular connector 18. The maximum power level can be any suitable amperage such as 100 amps for a ten slot modular connector 18 and 150 amps for a twenty slot modular connector 18. The electrical draw by one of the power distributors 25 of an associated module 14 preferably does not exceed the maximum power level and in turn should match a particular electrical power requirement of an associated peripheral device. In addition, a combination of electrical draws by a combination of power distributors 25 of the modules 14 preferably does not exceed the maximum power level. Even more preferably, an electrical draw by any power distributor 25 of any one slot 19 of an associated module 14 is limited to a 30 amp maximum.

At least one of the plurality of modules 14 also includes a switch 23 for controlling the transfer of electrical power to the associated peripheral device. In addition, at least one of the plurality of modules 14 can include a plurality of switches 23 for controlling a plurality of associated peripheral devices. As illustrated in FIG. 3, modules 14 located at the sixth through eighth and sixteenth positions include single switches 23 and modules 14 at the tenth and eleventh positions include a plurality of switches 23.

At least one of the plurality of modules 14 further includes a sensing receiver for receiving electrical signals from an associated peripheral device. The sensing receiver can be found at modules 14 located at the ninth and seventeenth positions.

At least one of the plurality of modules 14 further includes an secondary connector 21 electrically connected to the power source 16 for providing an additional power supply to an associated peripheral device. The secondary connector 21 can be found at module 14 at the sixteenth position.

In addition to the above, it should be appreciated that each of the plurality of modules 14 may have any combination of power distributors 25, switches 23, sensing receivers, and secondary connectors 21 without deviating from the overall scope of the subject invention.

The particular peripheral devices of the helm power control apparatus 10 of FIG. 3 are now discussed in greater detail. An autopilot 26 is shown connected to a module 14 at the fourth position and a shift/throttle control 28 is connected to a module 14 at the fifth position. The modules 14 for the autopilot 26 and shift/throttle control 28 do not have internal switches as the switches are on these peripheral devices 26, 28 themselves. The autopilot 26 and shift/throttle control 28 are connected to the connection ports 24 of the modules 14 by a first transmission cable 27. Each of these peripheral devices 26, 28 require 20 amps of electrical power. These devices 26, 28 are also connected to the data communication cable 20 such that these devices 26, 28 can transfer control signals to other power control apparatuses 10 throughout the boat. These devices 26, 28 may also receive information from other power control apparatuses 10. In particular, the autopilot 26 and shift/throttle control 28 are connected to the data communication cable 20 by a second transmission cable 29.

The autopilot 26 and shift/throttle control 28 can therefore communicate in two different ways which defines a modular data communication system. The modular data communication system includes each of the peripheral devices communicating with the interface module 22 through an associated module 14 and the modular connector 18. In addition, at least one of the peripheral devices is directly connected to the data communication cable 20 independent from the connection to the associated module 14 such that at least one of the peripheral devices communicates directly with the data communication cable 20 outside of the housing 12 independent of the interface module 22. The modular data communication system provides for communication between the modules 14 via the modular connector 18 and the interface module 22, and provides for communication between other power control apparatuses 10 via the data communication cable 20.

An interior or exterior light 30 is connected to a connection port 24 of a module 14 at the sixth position and a fan 32 is connected to a connection port 24 of a module 14 at the seventh position. A blower 34 is connected to a connection port 24 of a module 14 at the eighth position. The exterior light 30 and fan 32 require 5 amps of electrical power and the blower 34 requires 10 amps of electrical power. Each of these peripheral devices 30, 32, 34 also include a single internal switch 23 for controlling the transfer of electrical power. Control signals from the data communication cable 20, via the interface module 22, and/or from other modules 14, via the first transmission cable 27 and modular connector 18, can trigger the internal switches 23 to control these devices 30, 32, 34.

A tank sensor 36 is connected to a connection port 24 of a module 14 at the ninth position. The tank sensor 36 does not require a power source or an internal switch. The tank sensor 36 is utilized for a water or fuel tank and retrieves data which can be transmitted through the first transmission cable 27 to other peripheral devices via the modular connector 18.

A switch panel 38 is connected to two connection ports 24 of modules 14 which are located in the tenth and eleventh positions. These modules 14 include a plurality of switches 23 for controlling multiple peripheral devices. Hence, the switch panel 38 can control the switchable devices, i.e., the light 30, fan 32, or blower 34, through the first transmission cable 27 and modular connector 18 such that the control of these devices 30, 32, 34 is accomplished through the helm power control apparatus 10 without the need for the data communication cable 20. The switch panel 38 is also connected to the data communication cable 20, via the second transmission cable 29, such that the switch panel 38 at the helm power control apparatus 10 can also control peripheral devices at other power control apparatuses 10.

A bilge pump 40 is connected to a connection port 24 of a module 14 at the sixteenth position. The pump 40 includes both a power distributor 25 drawing 10 amps from the modular connector 18 and an internal switch 23. In addition, a secondary connector 21 is electrically connected to the power source 16 for providing an additional power supply to the bilge pump 40. This secondary or backup connector 21 is advantageous in that the bilge pump 40 can remain operational when the power control apparatus 10 is shut down.

A series of gauges 42 are connected to a connection port 24 of a module 14 at the seventeenth position. The series of gauges 42 do not require a power distributor nor do they include an internal switch. The gauges 42 are connected to send and/or receive data to and from other peripheral devices via the first transmission cable 27 through the use of a sensing receiver.

A GPS/sonar unit 44 is connected to a connection port 24 of a module 14 at the eighteenth position and a GPS/radar unit 46 is connected to a connection port 24 of a module 14 at the nineteenth position. Both the GPS/sonar 44 and the GPS/radar 46 units require a power distributor 25 for providing 5 amps and 10 amps of electrical power, respectively. These units 44, 46 are also connected to the data communication cable 20 via the second transmission cable 29. These units 44, 46 can therefore communicate between the other modules 14 at the helm power control apparatus 10, via the first transmission cable 27 and the interface module 22, and with a number of other devices throughout the boat, via the data communication cable 20. The GPS/sonar 44 and the GPS/radar 46 units also have their own switches such that internal switches at their respective modules 14 is not needed.

Positions one through three and positions twelve through fifteen are illustrated as being vacant wherein additional modules 14 may be inserted to control additional peripheral devices. One advantage of the subject invention is the adaptability and flexibility to easily add additional modules 14 to any of the vacant positions to provide power and/or communication to additional peripheral devices.

In addition, other peripheral devices, such at a data display unit 48 and a universal switching unit 50 can be connected to the data communication cable 20 through second transmission cables 29 without being connected to the helm power control apparatus 10 directly. The power supply within the data communication cable 20 provides adequate power to these devices 48, 50. These devices 48, 50 can interface with any of the other peripheral devices via the cable 20 and interface module 22.

Some of the modules 14 and/or peripheral devices at the helm power control apparatus 10 can include their own micro-processors separate from the communication processor at the interface module 22.

As illustrated at the helm power control apparatus 10 of FIG. 3, there is a total of 85 amps being used. This leaves a total of 65 amps remaining, assuming a 150 amp limit, for any additional modules 14.

Figure 4:
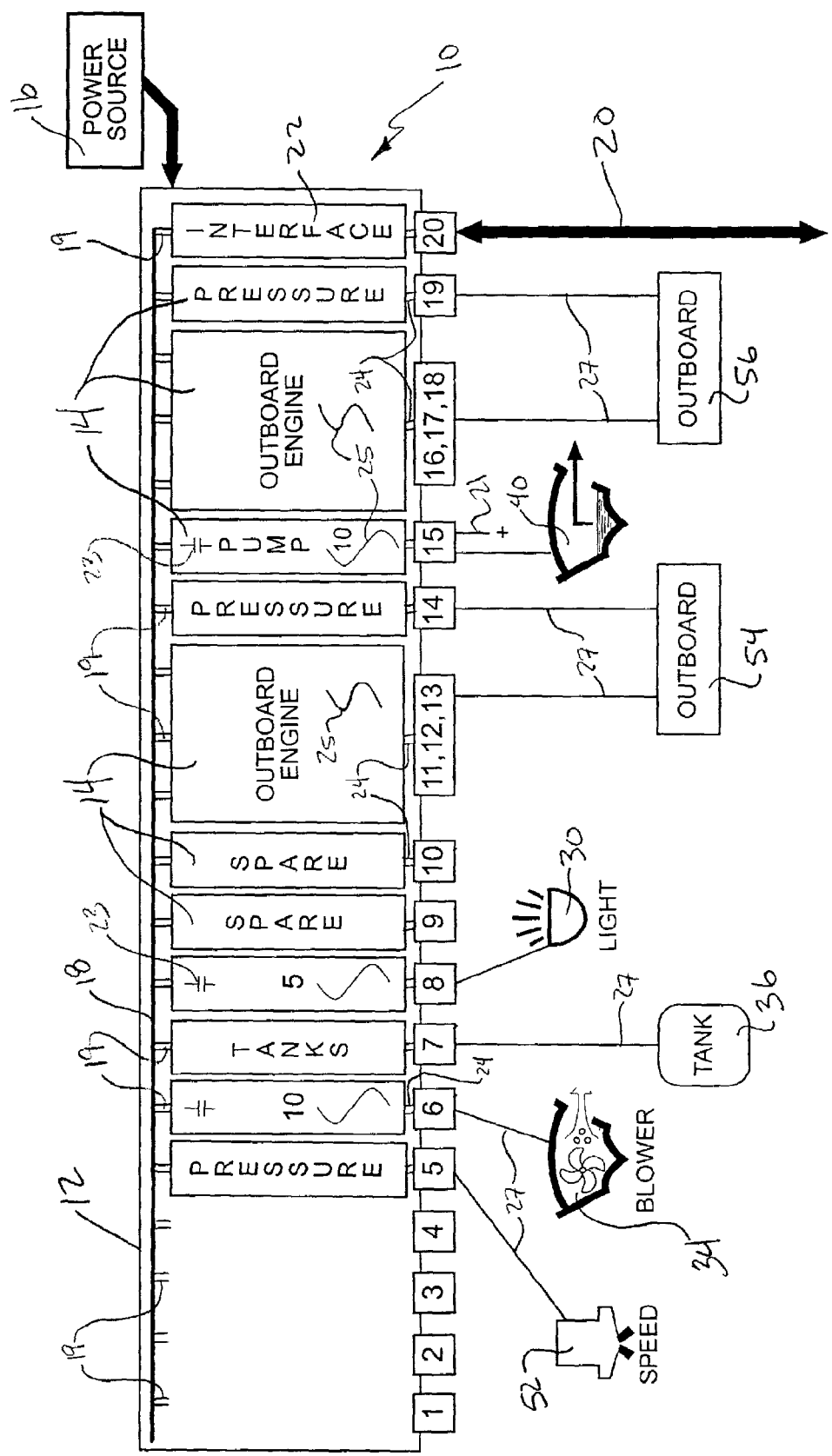
FIG. 4 is a view of the twenty slot modular power control apparatus illustrating the connection of typical peripheral devices which may be found at an engine station of a boat.

Referring to FIG. 4, a twenty slot engine power control apparatus 10 is illustrated showing the connection of typical peripheral devices which may be found at an engine station of a boat. As also set forth above, each position for the modules 14 is labeled 1–20. The engine power control apparatus 10 would typically be connected to the helm power control apparatus 10 via the data communication cable 20.

Each module 14 in the engine power control apparatus 10 similarly includes a connection port 24 extending therefrom for electrically connecting each module 14 to an associated peripheral device. As above, if desired, the module 14 can selectively transfer electrical power to the associated peripheral device. Further, the modular connector 18 can also transfer data between the modules 14 and the peripheral devices. Preferably, the interface module 22 selectively interfaces and transfers data to an appropriate module 14 and peripheral device.

The engine power control apparatus 10 illustrates seven peripheral devices which are connected to corresponding modules 14. As with the helm power control apparatus 10, the engine power control apparatus 10 preferably has at least one of the modules 14 incorporating a power distributor 25, a switch 23, a sensing receiver, and/or a secondary connector 21. In addition, at least one of the plurality of modules 14 further includes a pressure receiver for receiving pressure sensing signals from an associated peripheral device. As shown in FIG. 4, modules 14 located at the sixth, eighth, eleventh through thirteenth, and fifteenth through eighteenth positions have power distributors 25. Modules 14 located at the sixth, eighth, and fifteenth positions also include internal switches 23. A module 14 located at the seventh position includes a sensing receiver and a module 14 located at the fifteenth position includes a secondary connector 21. Modules 14 located at the fifth, fourteenth, and nineteenth positions include pressure receivers. In the embodiment of FIG. 4, the modular connector 18 also transfers electrical power to the interface module 22.

Another unique feature of the subject invention has at least one of the plurality of modules 14 being connected to two or more slots 19 to exponentially increase an available electrical power input to an associated module 14, thereby varying an electrical power output to an associated peripheral device which is dependent upon a particular electrical power requirement of the peripheral device. In other words, when a peripheral device has a larger than normal power requirement, a module 14 may be connected to more than one slot 19 to increase the electrical power available to the module 14. An example of such a module 14 is shown at positions eleven through thirteen and at positions sixteen through eighteen in FIG. 4.

As discussed above, the power source 16 preferably defines a maximum power level for the modular connector 18, which in the case for a twenty slot modular connector 18 would be 150 amps. The combination of electrical draws by the combination of power distributors 25 preferably does not exceed the maximum power level of 150 amps. Even more preferably, an electrical draw by any power distributor 25 from any one slot 19 of an associated module 14 is limited to a 30 amp maximum.

In addition to the module configurations set forth above, it should be appreciated that each of the plurality of modules 14 may have any combination of power distributors 25, switches 23, sensing receivers, pressure receivers, and secondary connectors 21 without deviating from the overall scope of the subject invention.

The particular peripheral devices of the engine power control apparatus 10 of FIG. 4 are now discussed in greater detail. A speed control sensor 52 is shown connected to a module 14 at the fifth position and a tank sensor 36 is shown connected to a module 14 at the seventh position. The speed control sensor 52 and tank sensor 36 are connected to the connection ports 24 of the modules 14 by a first transmission cable 27. Neither of these devices 52, 36 require a power distributor or an internal switch. The speed control sensor 52 does require a pressure receiver and the tank sensor 36 does require a sensing receiver.

A blower 34 is connected to a connection port 24 of a module 14 at the sixth position via a first transmission cable 27. An interior or exterior light 30 is connected to a connection port 24 of a module 14 at the eighth position via another first transmission cable 27. Both the blower 34 and the light 30, as above with the helm power control apparatus 10, require a power distributor 25 and include internal switches 23, in particular, the blower 34 requires 10 amps of electrical power and the light 30 requires 5 amps of electrical power. Control signals from the data communication cable 20, via the interface module 22, and/or from other modules 14, via the first transmission cable 27 and modular connector 18, can trigger the internal switches 23 to control these devices 34, 30.

A bilge pump 40 is connected to a connection port 24 of a module 14 at the fifteenth position. The pump 40 includes both a power distributor 25 drawing 10 amps from the modular connector 18 and an internal switch 23. In addition, a secondary connector 21 is electrically connected to the power source 16 for providing an additional power supply to the bilge pump 40.

A first outboard engine 54 is connected to a connection port 24 of a module 14 at positions eleven through fourteen and a second outboard engine 56 is connected to a connection port 24 of a module 14 at positions sixteen through nineteen. As discussed above, a module 14 may connected to more than one slot 19 to increase the available electrical power. As illustrated, the outboard engines 54, 56 require additional power such that one engine module 14 occupies three positions. Hence, a power distributor 25 of a single module 14 may draw more than the previously mentioned 30 amp maximum if the module 14 is connected to multiple slots 19. It should be appreciated, that modules 14 may occupy two, four, or any other number of positions as needed.

Another feature of the subject invention has peripheral devices being connected to two or more first transmission cables 27. As illustrated, the modules 14 at positions fourteen and nineteen are pressure receivers which are also connected to the outboard engines 54, 56.

Positions one through four and positions nine and ten are illustrated as being vacant wherein additional modules 14 may be inserted to control additional peripheral devices at the engine station. As with the helm power control apparatus 10, one advantage of the engine power control apparatus 10, is the adaptability and flexibility to easily add additional modules 14 to any of the vacant positions to provide power and/or communication to additional peripheral devices.

Some of the modules 14 and/or peripheral devices at the engine power control apparatus 10 can include their own micro-processors separate from the communication processor at the interface module 22.

Additional power control apparatuses 10 may be located at a second helm, such as on a tower or in a cabin as deemed necessary. More power control apparatuses 10 may be necessary as the size of the vehicle, e.g., boat, increases.

Obviously, many modifications and variations of the present invention are possible in light of the above teachings and the invention may be practiced otherwise than as specifically described within the scope of the appended claims.

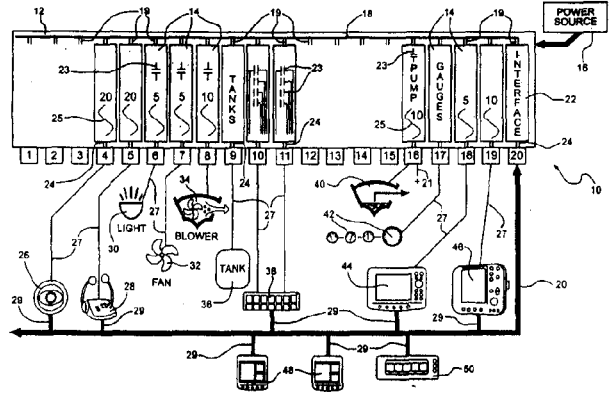

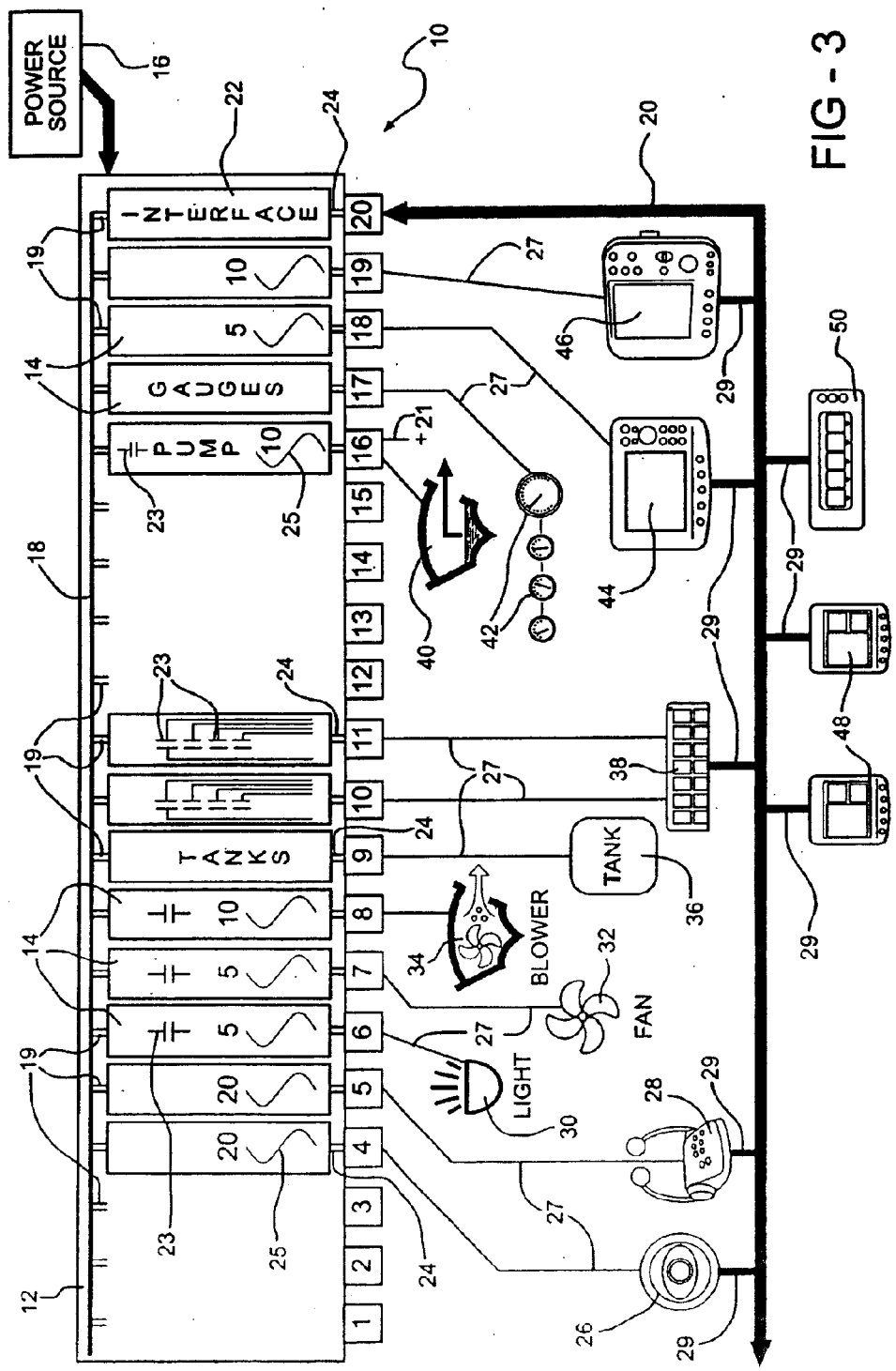

What is claimed is:

1. A vehicle assembly for use with a modular power control apparatus and a plurality of peripheral devices with the peripheral devices controlling one or more features of the vehicle assembly, said vehicle assembly comprising;
   a support structure adapted to be mounted within said vehicle assembly;
   a housing secured to said support structure;
   a plurality of modules supported by said housing;
   a connection port extending from each of said modules for electrically connecting each module to an associated peripheral device;
   an interface module supported by said housing and having a communication processor to selectively interface with said plurality of modules for routing data to an appropriate module and peripheral device;
   a data communication cable connected to said interface module and disposed outside of said housing for transferring data between said interface module and anyone of a variety of devices within said vehicle assembly;
   a power source connected to said housing; and
   a modular connector supported by said housing and electrically connected to said power source, said modular connector including a plurality of identical slots, said plurality of modules and said interface module being electrically connected to any one of said identical slots to transfer data between said modules and to provide electrical power to at least one of said modules, thereby facilitating communication with the peripheral devices and providing electrical power to at least one of the peripheral devices within said vehicle assembly.

2. A vehicle assembly as set forth in claim 1 wherein said modular connector transfers electrical power to said interface module.

3. A vehicle assembly as set forth in claim 1 wherein said modular connector transfers electrical power to said interface module and at least one of said plurality of modules such that there are at least two modules receiving electrical power.

4. A vehicle assembly as set forth in claim 1 wherein at least one of said plurality of modules includes a power distributor for transferring electrical power from said modular connector to an associated peripheral device.

5. A vehicle assembly as set forth in claim 4 wherein said power distributor draws up to 5 amps of electrical power from said modular connector.

6. A vehicle assembly as set forth in claim 4 wherein said power distributor draws up to 7.5 amps of electrical power from said modular connector.

7. A vehicle assembly as set forth in claim 4 wherein said power distributor draws up to 10 amps of electrical power from said modular connector.

8. A vehicle assembly as set forth in claim 4 wherein said power distributor draws up to 15 amps of electrical power from said modular connector.

9. A vehicle assembly as set forth in claim 4 wherein said power distributor draws up to 20 amps of electrical power from said modular connector.

10. A vehicle assembly as set forth in claim 4 wherein said power distributor draws up to 30 amps of electrical power from said modular connector.

11. A vehicle assembly as set forth in claim 4 wherein at least one of said plurality of modules includes a switch for controlling said transfer of electrical power to the associated peripheral device.

12. A vehicle assembly as set forth in claim 1 wherein at least one of said plurality of modules includes a switch for controlling an associated peripheral device.

13. A vehicle assembly as set forth in claim 12 wherein at least one of said plurality of modules includes a plurality of switches for controlling a plurality of associated peripheral devices.

14. A vehicle assembly as set forth in claim 1 wherein at least one of said plurality of modules includes a sensing receiver for receiving electrical signals from an associated peripheral device.

15. A vehicle assembly as set forth in claim 1 wherein at least one of said plurality of modules includes a pressure receiver for receiving pressure sensing signals from an associated peripheral device.

16. A vehicle assembly as set forth in claim 1 wherein at least one of said plurality of modules includes an secondary connector electrically connected to said power source for providing an additional power supply to an associated peripheral device.

17. A vehicle assembly as set forth in claim 1 wherein said power source defines a maximum power level for said modular connector.

18. A vehicle assembly as set forth in claim 17 wherein said maximum power level is 100 amps.

19. A vehicle assembly as set forth in claim 17 wherein said maximum power level is 150 amps.

20. A vehicle assembly as set forth in claim 17 wherein at least one of said plurality of modules includes a power distributor for transferring electrical power from said modular connector to an associated peripheral device.

21. A vehicle assembly as set forth in claim 20 wherein an electrical draw by said power distributor of an associated module does not exceed said maximum power level and matches a particular electrical power requirement of an associated peripheral device.

22. A vehicle assembly as set forth in claim 20 wherein a combination of electrical draws by a combination of said power distributors of said modules does not exceed said maximum power level.

23. A vehicle assembly as set forth in claim 20 wherein an electrical draw by said power distributor from any one slot of an associated module does not exceed 30 amps.

24. A vehicle assembly as set forth in claim 1 wherein at least one of said plurality of modules is connected to two or more slots to exponentially increase an available electrical power input to an associated module, thereby varying an electrical power output to an associated peripheral device which is dependent upon a particular electrical power requirement of the peripheral device.

25. A vehicle assembly as set forth in claim 1 wherein said data communication cable includes a power supply for providing a maximum of one amp of power to a connected peripheral device.

26. A vehicle assembly as set forth in claim 1 wherein said modular connector is further defined as a circuit board.

27. A vehicle assembly as set forth in claim 1 wherein said modular connector is further defined as a cable type connector.

28. A vehicle assembly as set forth in claim 1 further including a second housing having a second plurality of modules, a second power source, and a second modular connector with said second housing being connected to said first housing through said data communication cable.

29. A modular power control apparatus for use with a plurality of peripheral devices, said apparatus comprising;
a housing;
a plurality of modules supported by said housing;
a connection port extending from each of said modules for electrically connecting each module to an associated peripheral device;
an interface module supported by said housing and having a communication processor to selectively interface with said plurality of modules for routing data to an appropriate module and peripheral device;
a data communication cable connected to said interface module and disposed outside of said housing for transferring data between said interface module and anyone of a variety of devices;
a power source connected to said housing; and
a modular connector supported by said housing and electrically connected to said power source, said modular connector including a plurality of identical slots, said plurality of modules and said interface module being electrically connected to any one of said identical slots to transfer data between said modules and to provide electrical power to at least one of said modules, thereby facilitating communication with the peripheral devices and providing electrical power to at least one of the peripheral devices.

30. An apparatus as set forth in claim 29 wherein said modular connector transfers electrical power to said interface module and at least one of said plurality of modules such that there are at least two modules receiving electrical power.

31. An apparatus as set forth in claim 29 wherein at least one of said plurality of modules includes a power distributor for transferring electrical power from said modular connector to an associated peripheral device.

32. An apparatus as set forth in claim 31 wherein said power distributor draws up to 30 amps of electrical power from said modular connector.

33. An apparatus as set forth in claim 31 wherein at least one of said plurality of modules includes a switch for controlling said transfer of electrical power to the associated peripheral device.

34. An apparatus as set forth in claim 29 wherein at least one of said plurality of modules includes a sensing receiver for receiving electrical signals from an associated peripheral device.

35. An apparatus as set forth in claim 29 wherein at least one of said plurality of modules includes a pressure receiver for receiving pressure sensing signals from an associated peripheral device.

36. An apparatus as set forth in claim 29 wherein at least one of said plurality of modules includes an secondary connector electrically connected to said power source for providing an additional power supply to an associated peripheral device.

37. An apparatus as set forth in claim 29 wherein said power source defines a maximum power level for said modular connector.

38. An apparatus as set forth in claim 37 wherein a combination of electrical draws by a combination of said modules does not exceed said maximum power level.

39. An apparatus as set forth in claim 29 wherein at least one of said plurality of modules is connected to two or more slots to exponentially increase an available electrical power input to an associated module, thereby varying an electrical power output to an associated peripheral device which is dependent upon a particular electrical power requirement of the peripheral device.

40. An apparatus as set forth in claim 29 further including a second housing having a second plurality of modules, a second power source, and a second modular connector with said second housing being connected to said first housing through said data communication cable.

41. A modular data communication system comprising;
a housing;
a plurality of modules supported by said housing;
a connection port extending from each of said modules;
an interface module supported by said housing and having a communication processor to selectively interface with said plurality of modules for routing data to an appropriate module;
a modular connector supported by said housing and electrically connected to each of said modules for transferring data between said modules;
a plurality of peripheral devices with each of said peripheral devices electrically connected to said connection port of an associated module wherein said peripheral devices communicate with said interface module through said associated module and said modular connector for routing data to an appropriate peripheral device; and
a data communication cable connected to said interface module and disposed outside of said housing with said data communication cable transferring data between said interface module and anyone of a variety of devices;
said system characterized by at least one of said peripheral devices also being directly connected to said data communication cable independent from said connection to said associated module such that said at least one peripheral device communicates directly with said data communication cable outside of said housing independent of said interface module.

42. A system as set forth in claim 41 wherein said modular connector transfers electrical power to said interface module and at least one of said plurality of modules such that there are at least two modules receiving electrical power.

43. A system as set forth in claim 41 wherein at least one of said plurality of modules includes a power distributor for transferring electrical power from said modular connector to an associated peripheral device.

44. A system as set forth in claim 43 wherein said power distributor draws up to 30 amps of electrical power from said modular connector.

45. A system as set forth in claim 43 wherein at least one of said plurality of modules includes a switch for controlling said transfer of electrical power to said associated peripheral device.

46. A system as set forth in claim 41 wherein at least one of said plurality of modules includes a sensing receiver for receiving electrical signals from an associated peripheral device.

47. A system as set forth in claim 41 wherein at least one of said plurality of modules includes a pressure receiver for receiving pressure sensing signals from an associated peripheral device.

48. A system as set forth in claim 41 wherein at least one of said plurality of modules includes an secondary connector electrically connected to said power source for providing an additional power supply to an associated peripheral device.

49. A system as set forth in claim 41 wherein said power source defines a maximum power level for said modular connector.

50. A system as set forth in claim 49 wherein a combination of electrical draws by a combination of said modules does not exceed said maximum power level.

51. A system as set forth in claim 41 wherein at least one of said plurality of modules is connected to two or more slots to exponentially increase an available electrical power input to an associated module, thereby varying an electrical power output to an associated peripheral device which is dependent upon a particular electrical power requirement of said peripheral device.

52. A system as set forth in claim 41 further including a second housing having a second plurality of modules, a second power source, a second modular connector, and a second plurality of peripheral devices, with said second housing being connected to said first housing through said data communication cable.

53. A system as set forth in claim 41 wherein each of said peripheral devices are connected to said connection ports of said modules by a first transmission cable and are connected to said data communication cable by a second transmission cable.

54. A system as set forth in claim 41 wherein one of said peripheral devices communicates with another of said peripheral devices through said interface module and an associated module to transfer data between said peripheral devices.

55. A system as set forth in claim 41 wherein one of said peripheral devices communicates with another of said peripheral devices through said interface module and an associated module to transfer a control signal between said peripheral devices.

56. A system as set forth in claim 41 wherein said at least one peripheral device communicates with another peripheral device through said data communication cable outside of said housing independent of said interface module.

* * * * *

UNITED STATES PATENT AND TRADEMARK OFFICE
CERTIFICATE OF CORRECTION

PATENT NO. : 6,963,146 B2
DATED : November 8, 2005
INVENTOR(S) : Zecca et al.

It is certified that error appears in the above-identified patent and that said Letters Patent is hereby corrected as shown below:

Drawings,
Figs. 1-4, should be deleted and replaced with the drawings sheets, consisting of Figs 1-4, as shown on the attached pages.

Signed and Sealed this

Sixth Day of June, 2006

JON W. DUDAS
*Director of the United States Patent and Trademark Office*

United States Patent
Zecca et al.

(10) Patent No.: US 6,963,146 B2
(45) Date of Patent: Nov. 8, 2005

(54) MODULAR POWER CONTROL APPARATUS

(75) Inventors: James W. Zecca, Telford, PA (US); George L. Lewis, Raleigh, NC (US)

(73) Assignee: Teleflex Incorporated, Limerick, PA (US)

(*) Notice: Subject to any disclaimer, the term of this patent is extended or adjusted under 35 U.S.C. 154(b) by 495 days.

(21) Appl. No.: 10/072,755

(22) Filed: Feb. 7, 2002

(65) Prior Publication Data
US 2002/0105228 A1 Aug. 8, 2002

Related U.S. Application Data

(60) Provisional application No. 60/267,167, filed on Feb. 7, 2001.

(51) Int. Cl.$^7$ .................................................. B60L 1/00
(52) U.S. Cl. ........................................ 307/9.1; 307/10.1
(58) Field of Search .............................. 307/9.1, 10.1, 307/38–41, 43

(56) References Cited

U.S. PATENT DOCUMENTS

| | | | |
|---|---|---|---|
| 3,949,238 A | 4/1976 | Brookes | |
| 3,952,209 A * | 4/1976 | Shaklee et al. | 307/9.1 |
| 4,507,720 A * | 3/1985 | Colbrese | 363/13 |
| 4,652,769 A * | 3/1987 | Smith et al. | 307/31 |
| 4,877,972 A * | 10/1989 | Sobhani et al. | 307/43 |
| 5,179,376 A * | 1/1993 | Pomatto | 340/870.02 |
| 5,434,562 A * | 7/1995 | Reardon | 713/200 |
| 5,457,629 A | 10/1995 | Miller et al. | |
| 5,514,859 A | 5/1996 | Seigel | |
| 5,644,304 A * | 7/1997 | Pavarotti et al. | 340/953 |
| 5,656,869 A * | 8/1997 | Gluskoter et al. | 307/64 |
| 5,675,480 A * | 10/1997 | Stanford | 307/58 |
| 5,684,450 A * | 11/1997 | Brown | 340/310.02 |
| 5,896,418 A | 4/1999 | Hamano et al. | |
| 5,999,798 A * | 12/1999 | Yang | 455/66.1 |
| 6,038,500 A | 3/2000 | Weiss | |
| 6,062,903 A * | 5/2000 | Hawes et al. | 439/507 |
| 6,107,696 A | 8/2000 | Peter et al. | |
| 6,157,555 A * | 12/2000 | Hemena et al. | 363/71 |
| 6,169,338 B1 * | 1/2001 | Stoll et al. | 307/11 |
| 6,175,789 B1 * | 1/2001 | Beckert et al. | 701/33 |
| 6,189,057 B1 | 2/2001 | Schwanz et al. | |
| 6,202,008 B1 | 3/2001 | Beckert | |
| 6,256,557 B1 | 7/2001 | Avila et al. | |
| 6,301,528 B1 * | 10/2001 | Bertram et al. | 701/1 |
| 6,427,167 B1 * | 7/2002 | Siedel | 709/222 |
| 6,459,175 B1 * | 10/2002 | Potega | 307/149 |
| 6,469,404 B1 * | 10/2002 | Pohjola | 307/10.1 |

(Continued)

Primary Examiner—Robert L. Deberadinis
(74) Attorney, Agent, or Firm—Baker & Hostetler LLP

(57) ABSTRACT

A modular power control apparatus for use with a plurality of peripheral devices. A plurality of modules, which connect to the peripheral devices, are supported by a housing. An interface module is supported by the housing to selectively interface with the plurality of modules for routing data to an appropriate module and peripheral device. A data communication cable is connected to the interface module for transferring data between the interface module and anyone of a variety of devices. A power source is also connected to the housing. The vehicle assembly is characterized by a modular connector supported by the housing and electrically connected to the power source. The modular connector includes a plurality of identical slots with the plurality of modules and the interface module being electrically connected to any one of the identical slots to transfer data between the modules and to provide electrical power to at least one of the modules, thereby facilitating communication with the peripheral devices and providing electrical power to at least one of the peripheral devices within the vehicle assembly.

56 Claims, 3 Drawing Sheets